Dec. 10, 1957     S. SALKOWSKI     2,816,277
EMERGENCY DISTRESS SIGNAL INTERMITTENT FLASHER LANTERN
Filed Nov. 1, 1955     2 Sheets-Sheet 1
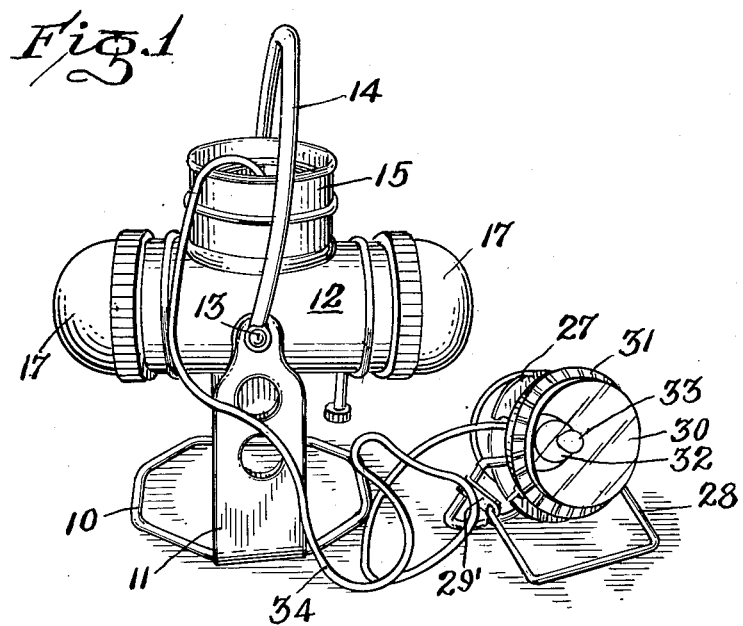
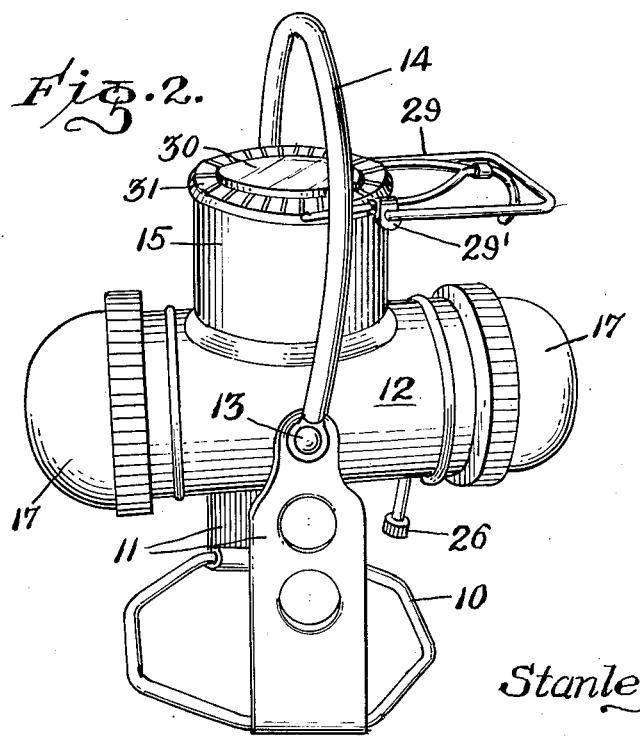
INVENTOR.
Stanley Salkowski Dec. 10, 1957 S. SALKOWSKI 2,816,277
EMERGENCY DISTRESS SIGNAL INTERMITTENT FLASHER LANTERN
Filed Nov. 1, 1955 2 Sheets-Sheet 2
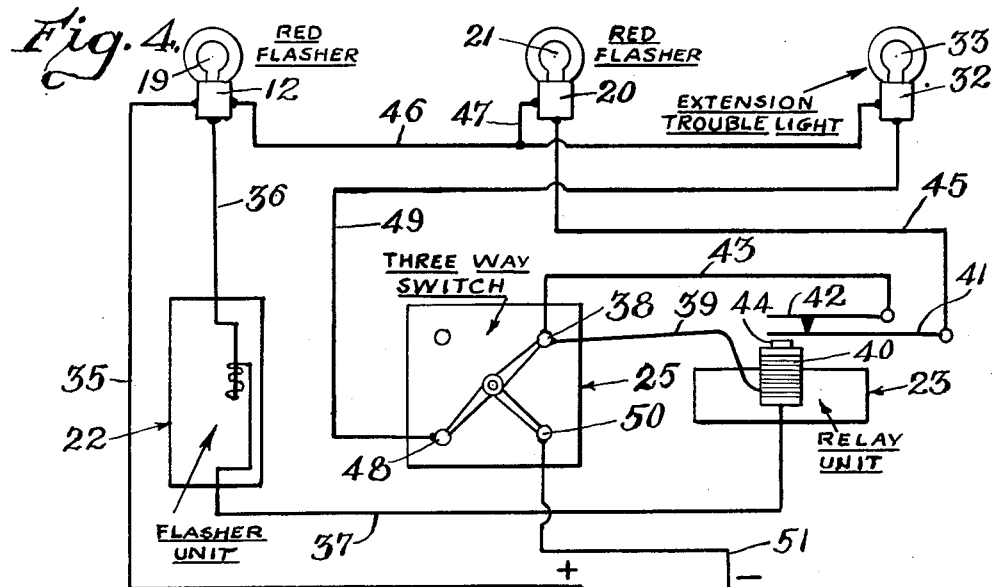
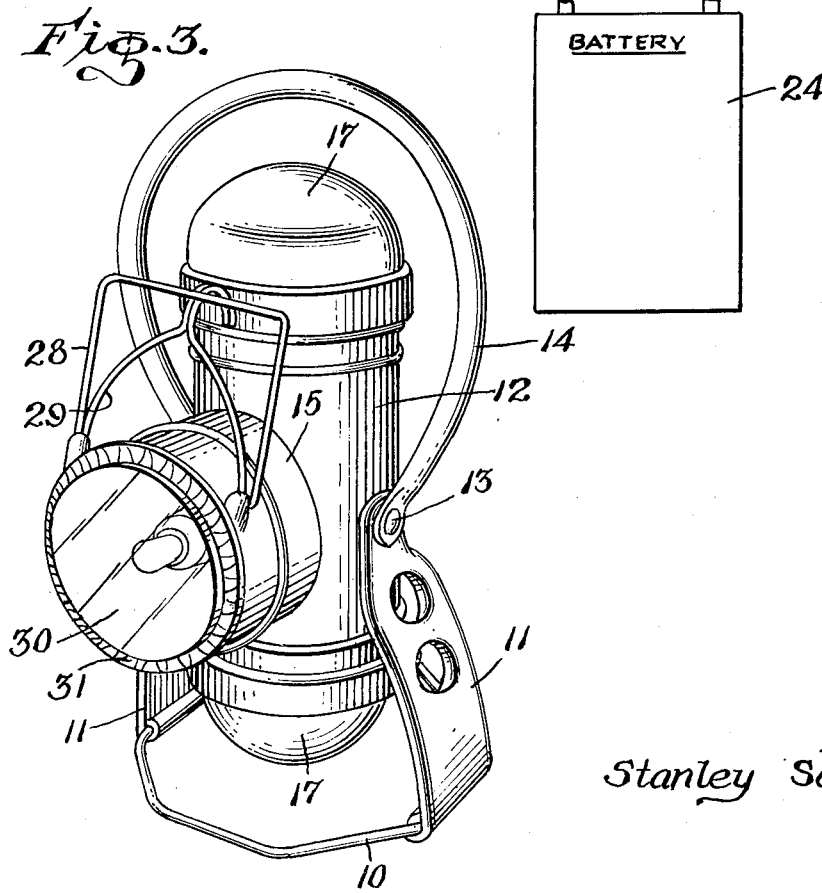
INVENTOR.
Stanley Salkowski United States Patent Office 2,816,277
Patented Dec. 10, 1957

2,816,277

EMERGENCY DISTRESS SIGNAL INTERMITTENT FLASHER LANTERN

Stanley Salkowski, Cleveland, Ohio

Application November 1, 1955, Serial No. 544,336

2 Claims. (Cl. 340—81)

This invention relates to vehicle distress signals and lanterns.

It is an object of the present invention to provide a vehicle distress signal which will protect the automobile owner when having vehicle trouble at night and which includes intermittent flasher lantern.

It is another object of the present invention to provide a vehicle distress signal of the above type which includes an extension trouble light and wherein the device may be used alternately as an ordinary hand lantern.

It is still another object of the present invention to provide a vehicle distress signal and lantern of the above type wherein the double flasher unit may be placed at the side of the car and the trouble extension light removed therefrom and wherein when the motorist is unable to leave the car due to heavy traffic, he may place the trouble flasher unit on the top of the car.

For other objects and a better understanding of the invention, reference may be had to the following detailed description taken in connection with the accompanying drawing, in which:

Figure 1 is a perspective view of a preferred embodiment of the present invention showing the trouble light removed therefrom;

Fig. 2 is a perspective view but showing the trouble light inserted into the flasher unit;

Fig. 3 is a perspective view similar to Fig. 2, but showing the flasher unit rotated through thirty degrees and the lantern or trouble light being used alone as a hand lantern; and Fig. 4 is a circuit diagram of the device.

Referring now more in detail to the drawing, 10 represents an octagonal wire stand to which is secured a pair of oppositely disposed upwardly extending supporting plates 11 at right angles thereto substantially as illustrated.

A hollow cylindrical casing 12 is pivotally mounted intermediate the upper ends of the supports 11 by means of the pins 13, the latter also serving to mount the upwardly extending handle 14.

The hollow cylindrical casing 12 intermediate the ends thereof at one side fixedly mounts the hollow cylindrical extension 15. A pair of hemispherical red distress lenses 17 are screwed onto the opposite ends of the casing 12. An electric lamp socket 18 (Fig. 4) is suitably mounted within one end of the casing 12 concentric with lens 17 and has screwed therein a bulb 19. A second electric lamp socket 20 is suitably mounted within the other end of the casing 12 concentric with lens 17 and has screwed therein a second lamp 21. A flasher unit indicated generally at 22 and a relay unit indicated generally at 23 are suitably mounted within the casing 12 intermediate the ends thereof along with a battery 24. A three-way switch indicated generally at 25 is suitably mounted within casing 12 near one end thereof and includes an external operating knob 26.

A separable cylindrical casing 27 pivotally mounts a self-contained stand comprising the rectangular front wire portion 28 and the rear hook shaped portion 29 which are adapted to be collapsed together or maintained in operative extended relationship (Figs. 1 and 2) by means of the adaptors 29' which connect the same. A lens 30 is screwed onto the front end of the casing 28 and includes a flange 31 adapted to abut the upper end of the casing 15 when the extension lamp is disposed therewithin, as shown in Fig. 2. An electric lamp socket 32 is suitably mounted within the casing 27 concentric with lens 30 and has screwed therein a lamp 33. An extension cord 34 connects the socket 32 with battery 24 (Fig. 1).

As shown in Fig. 4, one terminal of the socket 18 is connected to the positive terminal of battery 24 by means of a conductor 35 while the other terminal of the socket 18 is connected to one terminal of the flasher unit 22 by a conductor 36. The other terminal of the flasher unit 22 is connected to one terminal of the relay unit 23 by the conductor 37. The other terminal of the relay unit 23 is connected to a terminal 38 and the three way switch 25 by means of the conductor 39. The relay unit includes the usual solenoid 40, the opposite ends of which are connected to the conductors 39 and 37. The relay unit includes the pivoted arm 41 which is normally connected to the contact 42 which is in turn connected to the terminal 38 by conductor 43, the arm 41 being normally spaced from the core 44 of the solenoid. The arm 41 is connected to one terminal of lamp socket 20 by means of the conductor 45. The other terminal of lamp socket 20 is connected to a conductor 46 (which connects sockets 18 and 32) by means of a conductor 47. The other terminal of the socket 32 is connected to the terminal 48 of the three way switch 25 by means of the conductor 49. The negative terminal of battery 24 is connected to the terminal 50 of the three way switch 25 by means of the conductor 51.

In operation, when the switch 25 is turned on by means of the knob 26 (Fig. 4) the current from battery 24 illuminates the bulb 21 connected in the circuit of the relay unit 23. The flasher unit 22 then goes into operative action, illuminating the bulb 19 and energizing the solenoid 40, which pulls the arm 41 away from contact 42 to break the circuit of bulb 21, thus completing one cycle of operation. Upon turning the switch 25 to another position, the lamp 33 will operate simultaneously with the flashing lamps 19 and 21, as will be obvious. Turning the switch to still another position will turn off the flasher lamps 19 and 21 and retain the trouble light lamp 33 illuminated in which case the lamp will be used as shown in Fig. 3, as a hand lantern. Finally, the last position of the switch 25 will turn the entire unit off. When used as a double flasher unit and extension trouble light, the parts will be arranged as shown in Fig. 1. When being used only as a double flasher unit, the parts will be arranged as shown in Fig. 2.

The device may also be used for trucks in case of breakdowns and as a distress signal for small boats.

While various changes may be made in the detail construction, it shall be understood that such changes shall be within the spirit and scope of the present invention as defined by the appended claims.

What I claim as new and desire to protect by Letters Patent of the United States is:

1. A combination flasher unit and trouble light comprising a hollow elongated casing, support means, said casing being pivotally mounted intermediate the upper ends of said support means to permit its use in either the horizontal or vertical position, a hollow extension at one side of said casing, lens means at opposite ends of said casing, first and second electric lamp means mounted within said casing at opposite ends thereof, concentric with said lens means, a second casing adapted to be inserted in said extension and removable therefrom, third electric lamp means mounted within one end of said second casing, second lens means secured to the end of said casing, collapsible support means carried by said second casing to permit the same to be supported when removed from said extension, battery means within said first casing, a flasher unit within said first casing, a relay unit within said first casing, and a three way switch within said first casing having an external operating knob extending outwardly through said casing and an extension cord connecting said third electric lamp means with said battery.

2. A combination flasher unit and trouble light according to claim 1, one terminal of said first lamp means being connected to said flasher unit, the other terminal of said first lamp means being connected to one terminal of said battery, the other terminal of said flasher unit being connected to one terminal of said relay unit, said relay unit including a solenoid, armature, a fixed contact and a movable arm normally in contact with said fixed contact and spaced from said core, said movable arm being connected to one terminal of said second lamp means, the other terminal of said solenoid being connected to one terminal of said relay switch, said fixed contact being connected to the same terminal of said three way switch, another terminal of said three way switch being connected to said battery, a third terminal of said three way switch being connected to said third lamp means, said first and third lamp means being connected, said second lamp means being connected to the conductor connecting said first and third lamp means, said third lamp means being connected to said third terminal of said three way switch.

References Cited in the file of this patent
UNITED STATES PATENTS

| | | |
|---|---|---|
| 2,255,291 | Larson | Sept. 9, 1941 |
| 2,481,444 | Pierrez | Sept. 6, 1949 |
| 2,589,747 | Tedeschi | Mar. 18, 1952 |
| 2,684,476 | Trempe | July 20, 1954 |